May 13, 1930. H. D. GEYER 1,758,107
RUBBER SPRING SHACKLE
Original Filed May 18, 1926
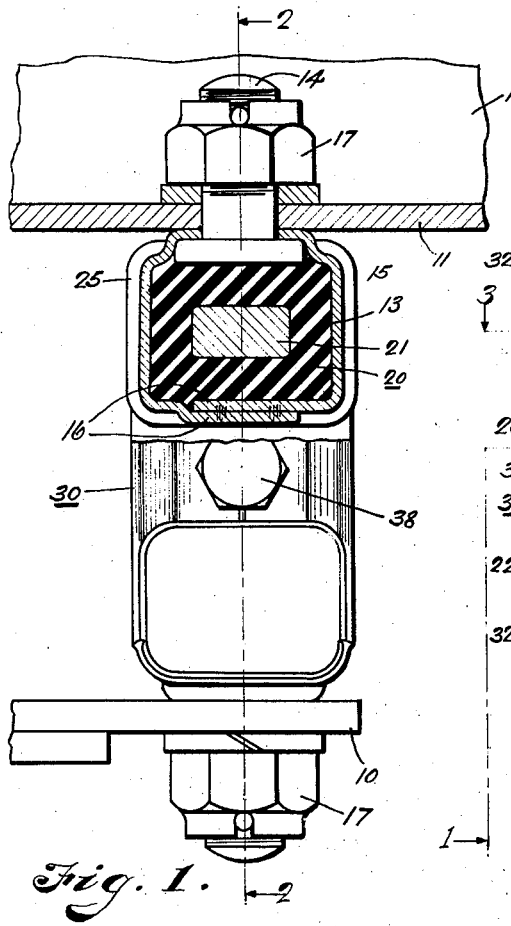
Fig. 1.
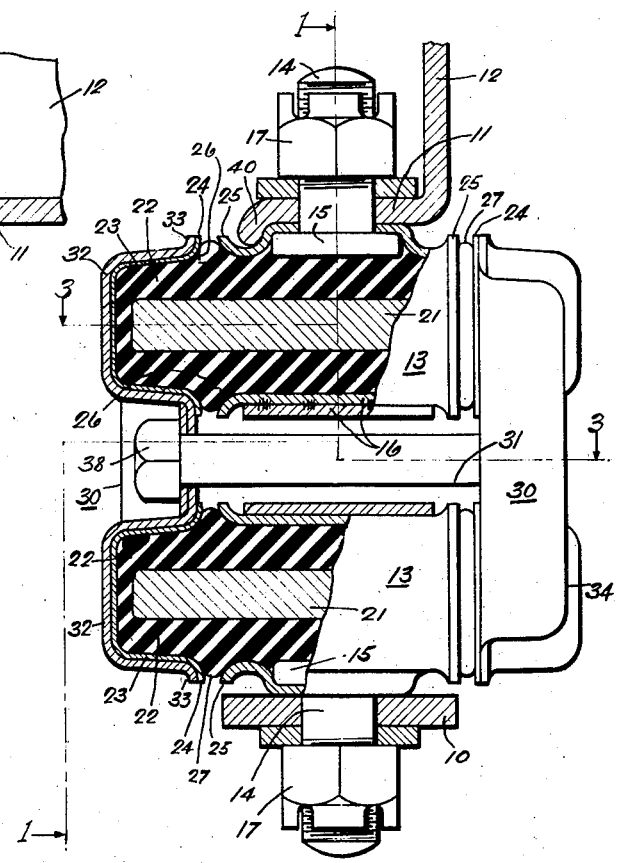
Fig. 2.
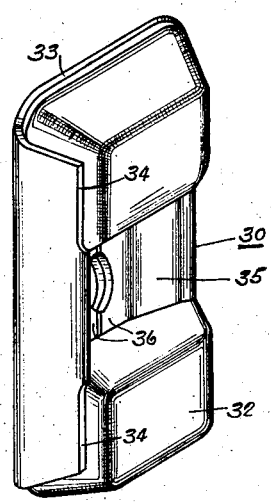
Fig. 4.
Fig. 3.
Inventor
Harvey D. Geyer
By Spencer, Sewall & Hardman
Attorney Patented May 13, 1930

1,758,107

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

RUBBER SPRING SHACKLE

Application filed May 18, 1926, Serial No. 109,980. Renewed September 27, 1929.

This invention relates to coupling members, especially such as are used as spring shackles on vehicles.

An object of this invention is to provide an improved form of rubber spring shackle wherein all movement is taken up by internal distortion of the rubber members, thereby avoiding the necessity of lubrication.

Another object is to provide such a shackle which can be very economically manufactured and easily assembled upon the vehicle, and which will not require special or costly forms of spring ends or chassis frame members for the proper attachment of the shackle thereto.

A more specific object is to provide such a shackle which is made up largely of metal stampings which require no machining, thereby greatly reducing the cost of manufacture.

Further objects and advantages of the present invention will be apparent from the following description, reference being had to the accompanying drawings, wherein a preferred form of embodiment of the present invention is clearly shown.

In the drawings:

Fig. 1 is a view on line 1—1 of Fig. 2 showing an automobile spring shackle made according to this invention.

Fig. 2 is a sectional view on line 2—2 of Fig. 1, a portion however being shown in elevation.

Fig. 3 is a section on line 3—3 of Fig. 2.

Fig. 4 is a perspective view of one of the stamped metal side links of the shackle.

Similar reference characters refer to similar parts throughout the several views.

Numeral 10 designates the end of the long spring leaf, and 11 is the lower flange of the side channel 12 of the chassis frame.

The flange 11 has an eye 13, preferably rectangular in cross section, rigidly fixed thereto by the bolt 14 having a square flat head 15. Preferably the eye 13 is formed from flat metal, the ends 16 thereof being overlapped and spot welded together. A suitable recess is provided for the square head 15 of bolt 14 in order to prevent possibility of the bolt turning when the nut 17 is turned to rigidly fix the eye to the flange 11. A rectangular section rubber block 20, having a metal insert 21 molded in place therein, is molded in the metal eye 13 with the bolt 14 inserted in place. This rubber block 20 extends laterally on both sides beyond the ends of the eye 13 and preferably has its two projecting ends 22 encased in thin metal caps 23, which caps are preferably also molded in place on the rubber block 20. These caps 23 are slightly tapered, as clearly shown, and are provided with flared flanges 24 which oppose the corresponding flared flanges 25 on the ends of the eyes 13.

When the rubber block 20 is set up in the vulcanizing mold the metal parts 13, 14, 21 and 23 are held fixed in their proper relative positions in the mold, as will be readily understood by those skilled in the art. The two caps 23 are spaced in the mold somewhat further from the flanges 25 of the eye 13 than as shown in the assembled shackle in Figs. 2 and 3. Suitable core members are inserted snugly between the spaced flanges 24 and 25 to a depth approximately equal to the width of these flanges in order to properly confine the rubber during vulcanization, as will be readily understood by those skilled in the art. Then when these core members are removed after the vulcanization of the rubber, there will be a corresponding groove in the molded block 20 somewhat as indicated by the dot and dash lines 26 in Fig. 2, though, as stated above, somewhat wider than here shown. When the caps 23 are pressed inwardly by means hereinafter described to compress the rubber block 20, the rubber flows to fill the grooves 26 and bulge outwardly between the flanges 24 and 25 as shown at 27 in full lines in Figs. 2 and 3.

A rubber and metal unit identical with that above described is also fixed to the spring end 10, the same reference characters being used to indicate corresponding parts in both the upper and lower units.

Two identical side links 30, a perspective view of which is shown in Fig. 4, are clamped upon the projecting ends 22 of the rubber blocks 20 by means of the cross bolt 31. These side links 30 are shown as stamped out from flat metal. The drawn tapered recesses 32 therein snugly house the metal caps 23, as shown in Fig. 2, and are provided with flared flanges 33 which back up the thin metal flanges 24. The lateral flanges 34 of the stamping are turned back against the sides of the recesses 32, as clearly shown in Figs. 3 and 4, to reinforce the same. Preferably these flanges 34 have tongues 35 which are turned downwardly in between the recesses 32, as clearly shown in Figs. 3 and 4, the inner ends 36 of these tongues being so positioned that they will be clamped under the nut 37 or head 38 of bolt 31. By this construction the side links 30 can be made very rigid and strong and since they are pressed out from flat metal they can be very economically manufactured.

In operation, the load of the vehicle is transmitted from the upper eye 13 fixed to the frame member 12 through the central portion of the rubber block 20 to the metal bar 21, thence from the ends of the bar 21 back through the end portions 22 of the rubber block to the upper ends 32 of the two side links 30. The load is transmitted from the lower ends 32 of the links 30 to the lower eye 13 fixed to the spring 10 in the same manner as above described. When the spring 10 is elongated by deflection causing the shackle to swing, the side links 30 are permitted to pivot at each end thereof substantially about the axes of the metal bars 21 by the internal twisting of the rubber block 20. The bars 21 are rotated through a small angle and this distributes the twist of the rubber block throughout its entire length, thus reducing the angle of twist to which the end portions 22 of the rubber block 20 would otherwise be subjected. The rubber bulges outwardly between the flanges 24 and 25 as shown at 27 when the side links 30 are drawn to position by tightening nut 37 of bolt 31. These bulges 27 therefore are not bonded to the metal of the flared flanges 24 and 25 and hence when flanges 24 and 25 rotate relative to one another the rubber may slightly separate from the flange at the four corner portions thereof. This will greatly reduce the amount of distortion on the rubber between the flanges 24 and 25 and permit it to have a long life.

These bulges 27 however so fill up the space between flanges 24 and 25 as to prevent dirt, water, mud, etc., from working down between the rubber and the metal parts and thereby causing rapid deterioration of the rubber.

In Fig. 2 of the drawing the edge of lower flange 11 of the frame member 12 is shown bent downwardly at 40 into the groove 41 extending across the top of the eye 13. The engagement of this downwardly turned edge 40 with the eye 13 positively prevents any possibility of the shackle turning relatively to the frame member 12 or spring 10 about a vertical axis through the center line of bolts 14.

The metal bars 21 preferably have a larger horizontal dimension than vertical dimension in order to provide a relatively wide flat bearing area for transmitting the load between the rubber block and bars 21.

While the form of embodiment of the present invention as herein disclosed, constitutes a preferred form, it is to be understood that other forms might be adopted, all coming within the scope of the claims which follow.

What is claimed is as follows:

1. In combination with a spring and frame member of a vehicle, a shackle comprising: an eye member fixed to the spring, a second eye member fixed to the frame member, a flexible rubber block non-rotatably retained in each of said eyes and having the ends thereof projecting laterally beyond the eyes, an isolated metal insert in each of said blocks, and a metal side link interconnecting the projecting ends of the two rubber blocks on each side of said eyes.

2. In combination with a spring and frame member of a vehicle, a shackle comprising: an eye member fixed to the spring, a second eye member fixed to the frame member, a flexible rubber block non-rotatably retained in each of said eyes and having the ends thereof projecting laterally beyond the eyes, an isolated metal insert in each of said blocks, and a metal side link non-rotatably retained upon the periphery of each of the two projecting ends of the two rubber blocks on each side of said eyes.

3. In combination with a spring and frame member of a vehicle, a shackle comprising: an eye member fixed to the spring, a second eye member fixed to the frame member, a flexible rubber block non-rotatably retained in each of said eyes and having the ends thereof projecting laterally beyond the eyes, an isolated metal insert in each of said blocks, and a metal side link clamped upon the projecting ends of the two rubber blocks on each side of said eyes.

4. In combination with a spring and frame member of a vehicle, a shackle comprising: an eye member fixed to the spring, a second eye member fixed to the frame member, a flexible rubber block non-rotatably retained in each of said eyes and having the ends thereof projecting laterally beyond the eyes, an isolated metal insert in each of said blocks, and a metal side link on each side of said eyes, each link having two sockets confining the projecting ends of the two rubber blocks.

5. In combination with a spring and frame member of a vehicle, a shackle comprising: an eye member fixed to the spring, a second eye member fixed to the frame member, a flexible rubber block non-rotatably retained in each of said eyes and having the ends thereof projecting laterally beyond the eyes, an isolated metal insert in each of said blocks, and a metal side link on each side of said eyes, each link having two sockets confining the projecting ends of the two rubber blocks, and a cross member interconnecting said side links for holding said side links in place.

6. In combination with a spring and frame member of a vehicle, a shackle comprising: an eye member fixed to the spring, a second eye member fixed to the frame member, a flexible rubber block non-rotatably retained in each of said eyes and having the ends thereof projecting laterally beyond the eyes, an isolated metal insert in each of said blocks extending laterally beyond the eye members, and a metal side link on each side of said eye members interconnecting the projecting ends of the two rubber blocks on each side.

7. In combination with a spring member and frame member of a vehicle, a coupling interconnecting said members comprising: a flexible rubber block having the periphery of its central portion fixed to said spring, a second flexible rubber block having the periphery of its central portion fixed to said frame, and a metal side link on each side interconnecting the end portions of the two rubber blocks.

8. In combination with a spring member and frame member of a vehicle, a coupling interconnecting said members comprising: a flexible rubber block having the periphery of its central portion fixed to said spring, a second flexible rubber block having the periphery of its central portion fixed to said frame, and a metal side link on each side interconnecting the end portions of the two rubber blocks, said side links having recesses for receiving said end portions, and means for urging said side links upon said end portions whereby said rubber blocks are put under compression.

9. In combination with two relatively movable members, a coupling interconnecting said members comprising: two metal sleeves adapted to be rigidly fixed in parallel relation one to each of said relatively movable members, an elastic rubber block having a metal insert molded therein retained in place within each of said sleeves and projecting laterally beyond the ends of said sleeves, and two metal side links each having cupped ends for receiving the laterally projecting portions of said rubber blocks, and a cross bolt for clamping said side links laterally upon said rubber blocks.

10. In combination with two relatively movable members, a coupling interconnecting said members comprising: two metal sleeves adapted to be rigidly fixed in parallel relation one to each of said relatively movable members, an elastic rubber block having a metal insert molded therein retained in place within each of said sleeves, and a metal side link on each side of said coupling, each link having two cups confining the two projecting ends of the two rubber blocks on each side of said coupling, and tie means for interconnecting said side links.

11. In combination with two relatively oscillatable members, a coupling inter-connecting said members, comprising: an eye member rigid with each of said two oscillatable members, a unit comprising a metal bar encased in flexible rubber material passing axially through and retained within each of said eyes and projecting beyond said eyes, and a metal side link inter-connecting the two projecting ends of said units on each side of said eyes.

12. In combination with two relatively oscillatable members, a coupling inter-connecting said members, comprising: an eye member rigid with each of said two oscillatable members, a unit comprising a metal bar encased in flexible rubber material passing axially through and retained within each of said eyes and projecting beyond said eyes, and a metal side link on each side of said eyes, each link having two sockets confining the projecting ends of said units, and means holding said side links forced axially toward each other and maintaining said units under axial compression.

13. In combination with two relatively oscillatable members, a coupling inter-connecting said members, comprising: an eye member rigid with each of said two oscillatable members, a unit comprising a metal bar encased in flexible rubber material passing axially through and retained within each of said eyes and projecting beyond said eyes, a metal side link on each side of said eyes, each link having two sockets confining the projecting ends of said units, and a cross member holding said side links forced axially upon said units and maintaining the rubber material under axial compression.

In testimony whereof I hereto affix my signature.

HARVEY D. GEYER.